(12) United States Patent
Brevnov et al.

(10) Patent No.: US 12,037,500 B2
(45) Date of Patent: Jul. 16, 2024

(54) COMPOSITION AND PRODUCTION METHOD FOR 3D PRINTING CONSTRUCTION MATERIAL

(71) Applicant: Mighty Buildings, Inc., Oakland, CA (US)

(72) Inventors: Petr Brevnov, Troitsk (RU); Guzel Kirsankina, Linogorsk (RU); Petr Nezhny, Moscow (RU); Nikita Lashmanov, Moscow (RU); Sergey Ryazantsev, Moscow (RU); Sergey Naumov, Moscow (RU); Dmitry Golovenko, Moscow (RU); Anna Fedosova, Moscow (RU); Anna Ivanova, Tomsk (RU); Egor Yakovlev, Saratov (RU); Alena Kharissova, Monterrey (MX)

(73) Assignee: Mighty Buildings, Inc., Oakland, CA (US)

( * ) Notice: Subject to any disclaimer, the term of this patent is extended or adjusted under 35 U.S.C. 154(b) by 57 days.

(21) Appl. No.: 17/824,697

(22) Filed: May 25, 2022

(65) Prior Publication Data

US 2022/0389248 A1 Dec. 8, 2022

Related U.S. Application Data

(60) Provisional application No. 63/193,054, filed on May 25, 2021.

(51) Int. Cl.
| | |
|---|---|
| *C08F 2/46* | (2006.01) |
| *C08F 2/50* | (2006.01) |
| *C08G 61/04* | (2006.01) |
| *C08K 3/40* | (2006.01) |
| *C09D 11/107* | (2014.01) |
| *C08K 3/32* | (2006.01) |

(52) U.S. Cl.
CPC ............. *C09D 11/107* (2013.01); *C08K 3/40* (2013.01); *C08K 2003/322* (2013.01); *C08K 2003/323* (2013.01)

(58) Field of Classification Search
CPC ............... C08K 3/40; C08K 2003/322; C08K 2003/323; C08K 7/20; B33Y 70/00; C09D 11/101; C09D 11/107; C09D 11/38
USPC .......... 522/36, 33, 6, 189, 184, 71, 1; 520/1
See application file for complete search history.

(56) References Cited

U.S. PATENT DOCUMENTS

| | | | |
|---|---|---|---|
| 4,305,863 A | 12/1981 | Adachi et al. | |
| 7,759,405 B2 | 7/2010 | Hong et al. | |
| 9,527,992 B2 | 12/2016 | Shulga et al. | |
| 9,822,234 B2 | 11/2017 | Biecker et al. | |
| 11,267,913 B2 | 3/2022 | Korshikov et al. | |
| 2003/0032692 A1 | 2/2003 | Mejiritski et al. | |
| 2003/0092820 A1 | 5/2003 | Schmidt et al. | |
| 2006/0079612 A1* | 4/2006 | Troutman | C09D 5/185 |
| | | | 524/99 |
| 2006/0286383 A1 | 12/2006 | Gilmer | |
| 2007/0116311 A1* | 5/2007 | Litke | C08L 75/16 |
| | | | 381/322 |
| 2013/0184377 A1 | 7/2013 | Ogura et al. | |
| 2014/0239527 A1 | 8/2014 | Lee | |
| 2015/0304639 A1 | 10/2015 | Lin | |
| 2023/0331890 A1* | 10/2023 | Kirsankina | B29B 7/7461 |

OTHER PUBLICATIONS

International Search Report and Written Opinion in International PCT application No. PCT/US23/21213, mailed Jul. 31, 2023.
"Photomer 3016-20D." Special Chem, Jul. 8, 2020, https://coatings.specialchem.com/product/r-igm-resins-photomer-3016-20d.
He, Y., Zhang, F., Saleh, E., Vaithilingam, J., Aboulkhair, N.T., Begines, B., Tuck, C.J., Hague, R.J., Ashcroft, I.A., & Wildman, R.D. (2017). A Tripropylene Glycol Diacrylate-based Polymeric Support Ink for Material Jetting. Additive manufacturing, 16, 153-161.

* cited by examiner

*Primary Examiner* — Jessica Whiteley
(74) *Attorney, Agent, or Firm* — Cognition IP, P.C.; Edward Steakley; Justin White (57) ABSTRACT

A composition for a 3D printing construction material includes an acrylate oligomer, an acrylate monomer, a UV photoinitiator, a flame retardant, fillers, and additives. In the composition, the acrylate oligomer may be between about 0-30.0 wt % of the composition. The acrylate monomer may be between about 0-30.0 wt % of the composition. The UV photoinitiator may be between about 0.02-1.0 wt % of the composition. The flame retardant may be between about 2.0-20.0 wt % of the composition. The fillers may be between about 20.0-80.0 wt % of the composition. The additives may be between about 0-3.0 wt % of the composition. A method for manufacturing a composition for a 3D printing construction material includes combining an acrylate oligomer, an acrylate monomer, an Uaphotoinitiator, a flame retardant, fillers, and additives.

33 Claims, 1 Drawing Sheet

COMPOSITION AND PRODUCTION METHOD FOR 3D PRINTING CONSTRUCTION MATERIAL

CROSS-REFERENCE TO RELATED APPLICATIONS

This application claims the benefit of U.S. Provisional Application Ser. No. 63/193,054, filed May 25, 2021, the entire content of which is incorporated by reference herein.

FIELD OF THE INVENTION

The invention relates to the composition and method of production of 3D printing construction materials.

BACKGROUND OF THE INVENTION

Three-dimensional (3D) printing, also known as additive manufacturing, is a technique that deposits materials only where needed, thus resulting in significantly less material wastage than traditional manufacturing techniques, which typically form parts by reducing or removing material from bulk material. Recently, 3D printed articles were generally models; the industry is rapidly evolving these days, creating 3D printed articles that may be functional parts in more complex systems, such as hinges, tools, and structural elements.

In existing 3D printing processes, a 3D object is created by forming layers of material under computer control without molding. For example, 3D information of a structure is determined using computer 3D modeling fragmentation, and the mixture prepared for printing the structure can be fed from a nozzle using a mechanical control based on 3D modeling.

The modern construction industry is facing a shortage of 3D printing materials that meet the requirements and standards of the industry. For example, existing 3D printing materials are mainly thermoplastics. The thermoplastics are printed in a molten state at a high temperature via layer-by-layer deposition. The need to use high temperatures for 3D printing with thermoplastic material limits the scalability of 3D printing of thermoplastics for the printing of large building panels or residential buildings. Power consumption for melting thermoplastics is high, and parts in a printer should be manufactured using a material enduring high temperature, thereby causing an unnecessary increase in production costs. Other disadvantages of thermoplastics are high creep and low long-term strength.

Cement or geopolymer-based concrete is another example of printing material.

To meet the industry's requirements, cementitious materials for extrusion-based printing must have contradictory rheological properties. For example, to carry its own weight, concrete must have high compressive and shear strengths, and the water-to-cement ratio should be as low as possible. However, a specific water content must be maintained for the concrete to be workable. Concrete must have a fluid consistency, but it must also be able to keep the extruded layer form and withstand further layers' weight. Finally, when extruded, the mixture should dry as soon as possible, yet keep its wetness for a long enough time to provide bonding with the next layer, rather than drying altogether. Companies such as ICON, ApisCor, and COBOD, have made great progress in developing 3D concrete printing technology, which allows them to erect sufficient quality buildings on-site for a shorter period than traditional construction. Concrete 3D-printed buildings cannot fully utilize the power of 3D printing and all of its benefits. A concrete wall with relevant performance for construction requires a complex assembly of various materials and involves a multitude of processing steps. As structural material concrete provides good compressive strength, however, it does not show satisfying characteristics under tension. Due to building code constraints, 3D printed concrete walls serve as a formwork mostly and still need to be reinforced (typically with metal but not always with rebar) and more concrete poured into the internal cavities.

Further disadvantages of using cement-based materials are that print resolution is constrained by material rheology and nozzle dimensions, limiting the achievable print tolerances. These tolerances are often larger than those required for component interfaces and surface finishing in construction applications. This makes post-processing more complicated and time-consuming, causes additional waste, and significantly increases production costs.

3D printed concrete technology has primarily been used in on-site construction rather than off-site. Concrete is too heavy and fragile to be used in prefabricated buildings. In the meanwhile, off-site construction methods have advantages over on-site methods such as much greater control over the manufacturing process translating into higher quality products. Weather delays can be reduced, automatization tools can be used to their full potential, and supplies can be organized and easily available.

Many prefab companies are that are harnessing the power of off-site construction and its many benefits, for instance, Cover, Veev, and Plant Prefab. Existing prefab technologies are limited in the variety of surface designs, textures, and finishes. Moreover, materials that are used in subtractive manufacturing are not easy to manipulate into unique shapes or patterns. These flaws can be overcome by 3D printing with a material that meets construction industry criteria while remaining lightweight and durable.

3D printing off-site enables much greater control over the manufacturing process translating into higher quality products. In light of the foregoing, a material that can harness the power of 3D printed technology and modern off-site prefabricated house-building methods need to be developed to take advantage of this technology.

In conventional additive or 3D fabrication techniques, the printing of a three-dimensional object is performed in a stepwise or layer-by-layer manner. In particular, layer formation is performed through the solidification of resin under the action of visible light or UV irradiation. Two techniques are known: one in which new layers are formed at the top surface of the growing object; the other in which new layers are formed at the bottom surface of the growing object. Photochemical curing, also known as photopolymerization, is an inexpensive and efficient method of additive manufacturing.

The main drawback of light-curing is the limited penetration of light into the irradiated material, which gets even more limited in presence of colored, semi-transparent, or opaque additives, which are frequently used to give the material functional properties. In any known layer-by-layer printing process using polymer materials, the polymer matrix embedded with the composition of the filler must allow UV light penetration depth to be sufficient for a complete layer solidification.

Early efforts to create photopolymer composite materials for a 3D printing system that includes an acrylate oligomer, an inorganic hydrate, a reinforcing filler, and a UV initiator (US2019/0248932) identify the need for modification of the composition to extend the storage time of the composition and optimize the flame retardant content. There is also an unmet need for higher material rigidity, strength, and better adhesion to paint and foam. These and other objects are achieved through this invention's composition and methods, which comprises the upgrading of acrylate oligomers, acrylate monomers, flame retardants, fillers, and additives.

SUMMARY OF THE INVENTION

The invention presents a composition of photocurable composition for 3D printing construction material and the method of the composition's production.

It is an object of this invention to create a photopolymer composite material for a 3D printing of construction materials that can meet all requirements for higher material properties such as rigidity and strength, and better adhesion to paint and foam.

It is an object of this invention to create a photopolymer composite material for a 3D printing construction elements (such as exterior or/and interior walls, load-bearing exterior walls, structural members, and partitions) that can meet the requirements of the industry, for instance, high stiffness and strength, lightweight, durability and low carbon footprint.

There are other objects of the invention to provide a material that can be extruded by 3D printing at a printing speed of 7-90 cm3/s and that allows a photopolymerization reaction to proceed rapidly under UV irradiation at a depth of about 4 to 8 mm, also to develop a composite material that retains its properties for a long storage time (more than 6 months) before printing and optimize the fire retardant properties of the photopolymer composite material for 3D printing, taking into account the fire safety requirements of the design with an assessment of the resistance and flame spread index indoors according to the International Building Code.

DETAILED DESCRIPTION OF THE INVENTION

The presently disclosed subject matter will now be described more fully hereinafter. However, many modifications and other embodiments of the presently disclosed subject matter set forth herein will come to mind to one skilled in the art to which the disclosed subject matter pertains to benefit from the teachings presented in the foregoing descriptions. Therefore, it is to be understood that the presently disclosed subject matter is not to be limited to the specific embodiments disclosed and that modifications and other embodiments are intended to be included within the scope of the appended claims.

Herein, "comprise" and "include" mean that other elements and/or other steps which do not affect the end result can be added. Each of these terms encompasses the terms "consisting of and "consisting essentially of".

Herein, "curing" refers to the solidification of the composition as a result of polymerization and crosslinking of acrylate monomers and acrylate oligomers.

Herein, "acrylate monomer" refers to the reactive diluent, the compound with a viscosity up to 500 mPa s at 25° C. containing acrylate or methacrylate groups capable of radical polymerization.

Herein, "acrylate oligomer" refers to the compound with a viscosity of more than 500 mPa s at 25° C. containing acrylate or methacrylate groups capable of radical polymerization.

Herein, "(meth)acrylate" refers to both acrylate and methacrylate.

Herein, "UV photoinitiator" refers to compounds that create reactive species (free radicals, cations, or anions) when exposed to UV light.

Herein, "Type I photoinitiator" refers to the compounds that undergo a unimolecular bond cleavage upon irradiation to yield free radicals.

Herein, "Type II photoinitiator" refers to the compounds that undergo a bimolecular reaction where the excited state of the photoinitiator interacts with a second molecule (a co-initiator, synergist) to generate free radicals.

Herein, "resin" refers to the liquid part of the composition consisting of acrylate oligomer and acrylate monomer.

Herein, "functionality" refers to the quantity of acrylic or methacrylic groups in a molecule. For example, the term monofunctional (meth)acrylate" means that a molecule contains one acrylic or methacrylic group.

Herein, "shrinkage" refers to the sum of the volume contraction of composition during curing and cooling to ambient temperature.

Herein, "flame retardant" refers to the compounds preventing the combustion of the material. The use of flame retardant in sufficient amounts improves the fire resistance of construction material.

Herein, "fillers" refers to the components embedded into the resin to provide enhancement or/and set up mechanical and thermal properties of construction material, with reduced negative post-curing effects such as shrinkage, warpage, and cracking.

Herein, "additives" refer to the substances that are added to the composition in small quantities to improve technological properties, storage stability, durability, and strengthening of the material.

Herein, "thixotropic additives" refer to the substances which enhance thixotropy resulting in prevented sedimentation of the fillers.

Herein, "a coupling agent" refers to the substance that is applied to a filler to increase adhesion to a binder.

Herein, "elastic modulus" refers to both tensile modulus and compression modulus.

The components' concentration in the composition is given in weight percentage (wt %) units.

The present invention relates to a photopolymer composite construction material that meets the requirements of the extrusion 3D printing technology and the demands of building construction material. The photopolymer composite material must meet the specific requirements for viscosity, stability to sedimentation, and capability of curing under UV irradiation.

The invention is aimed to develop a 3D printing photocurable composition showing appropriate flow properties and stability to sedimentation. These factors are associated with composition printability and material stability in storage. In the present application, the printability of the material and stability to sedimentation is ensured by choosing the resin and selecting its concentration.

The polymerizable resin used in the developed composite material is capable of curing in the presence of UV photoinitiators under UV irradiation. In the course of the layer-by-layer deposition of the 3D printing material, the resin is capable of completely saturating the surface of the previously cured layer and forming chemical bonds so that each newly curable layer is firmly fixed to the previous one and provides strong interlayer adhesion strength which is essential for the building material with the load-bearing capacity.

The 3D printing UV curable composition must have a proper curing rate allowing the extruded layer to keep its shape and capability of bearing sequentially extruded layers.

According to the present invention, the chemical composition, and the contents range, make it possible to obtain the desired properties of the composite applicable for 3D printing and the final mechanical properties of 3D printed parts, such as high rigidity, low deformability, fire resistance, and a fracture resistance, the strength required for load-bearing structures in construction, as well as high adhesion to coating and foam.

The invented composition is having a viscosity in the range of 10 000-300 000 mPa·s so that the material can be extruded during 3D printing with the printing speed of 7-90 cm$^3$/sec and allowing the photopolymerization reaction under UV irradiation to proceed rapidly in the depth of about between 4 to 8 mm.

The mechanical characteristics of the resulting 3D printed construction material are presented in Table 1.

TABLE 1

| Parameter | Value |
| --- | --- |
| Elastic modulus, GPa | 2-12 |
| Tensile strength, MPa | 8-25 |
| Compression modulus, GPa | 2-12 |
| Compression strength, MPa | 40-80 |
| Impact resistance, kJ/m2 | 1-10 |
| Density, kg/m3 | 1200-2000 |
| Thermal conductivity, W/(m · K) | 0.30-0.55 |
| Coefficient of linear thermal expansion, ° C.−1 | 20 · 10-6-50 · 10-6 |
| Paint adhesion strength, MPa | 1.5-4.0 |
| Foam adhesion strength, MPa | 0.2-0.5 |

The invented material comprises a base organic matrix (resin) which includes acrylate oligomer and acrylate monomer, UV photoinitiator, fillers, flame retardants, and additives.

The resin provides the fluidity of composition required for 3D printing as well as the high strength, plasticity, impact resistance, and low thermal conductivity of printed construction material.

The fillers contribute to high elastic modulus, strength, and low coefficient of thermal expansion of construction material. The fillers do not precipitate during the printing process due to the high viscosity of the resin and the use of thixotropic additives, ensuring a homogeneous composition. During a long time of storage of 6 months and more, the fillers can precipitate but the composition remains easily recoverable.

The flame retardants improve fire resistance to photopolymer composite construction material.

Additives improve the technological properties of the composition and durability of the composite material.

The present invention also relates to the method of the production of the composite construction 3D printing material. The method comprises of combining an acrylate oligomer in the range between about 0-30.0 wt % of the composition, an acrylate monomer in the range between about 0-30.0 wt % of the composition, a UV photoinitiator in the range between about 0.02-1.0 wt % of the composition, a flame retardant in the range between about 2.0-20.0 wt % of the composition, fillers in the range between about 20.0-80.0 wt % of the composition, and additives in the range between about 0-3.0 wt % of the composition. The method further comprises producing 3D printing photopolymer composition by blending the components of the composition.

Figure 1:
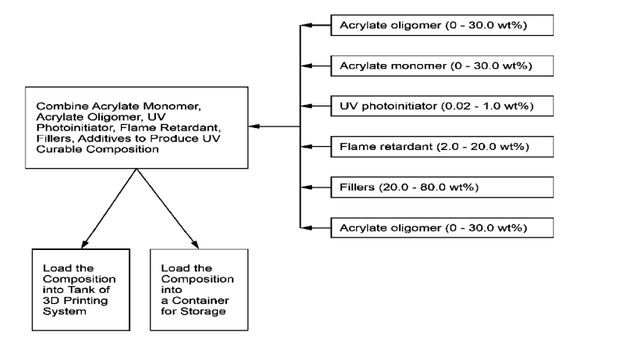
FIG. 1 illustrates representative groups of components of the 3D printing construction material and the major production steps

The present invention, 3D printing photopolymer composition, may include an acrylate oligomer, an acrylate monomer, a UV photoinitiator, a flame retardant, fillers, and additives (FIG. 1)

The acrylate oligomers provide the required viscosity of the composition, low shrinkage, and provide the required mechanical properties for construction material.

In some embodiments of the composition, some of the acrylate oligomers may be bisphenol A epoxy diacrylate. Bisphenol A epoxy diacrylate, a bifunctional acrylate oligomer, is a transparent liquid with high viscosity. A bisphenol A epoxy diacrylate may be found ranging between about 0-30 wt % (preferably 8-15 wt %) of the composition. The bisphenol A epoxy diacrylate provides high reactivity, chemical resistivity, and high rigidity to the cured material.

Some properties of Bisphenol A epoxy diacrylate are found in Table 2.

TABLE 2

| Bisphenol A epoxy diacrylate | |
| --- | --- |
| Parameter | Value |
| Density at 25° C., kg/m$^3$ | 1170 |
| Viscosity at 25° C., mPa · s | 400 000-600 000 |
| Viscosity at 60° C., mPa · s | 2000-4000 |
| Refractive Index, unit | 1.557 |
| Acid value, mg KOH/g | ≤2 |
| Epoxy content, % | ≤0.5 |
| Functionality, theoretical | 2 |

In some embodiments of the composition, some of the acrylate oligomers may be modified bisphenol A epoxy diacrylate. Modified bisphenol A epoxy diacrylate, a bifunctional acrylate oligomer, is a transparent liquid with high viscosity. A modified bisphenol A epoxy diacrylate may be found ranging between about 0-30 wt % (preferably 10-15 wt %) of the composition. The modified bisphenol A epoxy diacrylate provides improved flexibility to the cured material.

Some properties of Modified Bisphenol-A-epoxy diacrylate are found in Table 3.

TABLE 3

| Modified Bisphenol A epoxy diacrylate | |
| --- | --- |
| Parameter | Value |
| Density at 25° C., kg/m$^3$ | 1090 |
| Viscosity at 25° C., mPa · s | 20 000-30 000 |
| Viscosity at 60° C., mPa · s | 400-700 |
| Refractive Index, unit | 1.533 |
| Acid value, mg KOH/g | ≤3 |
| Epoxy content, % | ≤0.5 |
| Functionality, theoretical | 2 |

In some embodiments, the acrylate oligomer may be polyester acrylate. Polyester acrylate may be found ranging between about 0-30 wt % (preferably 8-15 wt %) of the composition. Polyester acrylate provides good abrasion resistance, solvent resistance, and hardness.

Some properties of polyester acrylate are found in Table 4.

TABLE 4

| Polyester acrylate | |
|---|---|
| Parameter | Value |
| Density at 25° C., kg/m³ | 1.15 |
| Viscosity at 25° C., mPa · s | 14 000 |
| Molecular Weight, theoretical, g/mol | 780 |
| Functionality, theoretical | 4 |

Additionally, and/or acrylate oligomers may include different types such as polyurethane acrylate, and polyether acrylate, including oligomers based on renewable resources such as epoxidized soya oil acrylates, as well as their combination can be used.

In some embodiments, the acrylate monomer may be found ranging between about 0-30 wt % of the composition. The acrylate monomer provides the required viscosity and reactivity for the composition.

Required fluidity of composition as well as resistance to filler sedimentation, are largely determined by the viscosity of the resin, which in this application consists of an acrylic oligomer and an acrylic monomer.

In general, the resin viscosity of the composition may be ranging between about 50-10000 mPa·s (25° C.), preferably 150-500 mPa·s.

The type of acrylate oligomer and acrylate monomer, as well as their ratio, determine the properties of both the resin itself and the entire composition. Increasing the acrylate oligomer/acrylate monomer ratio leads to increasing resin viscosity and a decrease in shrinkage.

The resin can be composed entirely of one component: acrylate oligomer or acrylate monomer if it has the required characteristics.

In some embodiments, the acrylate monomer may be tripropylene glycol diacrylate. Tripropylene glycol diacrylate is a low-viscosity transparent liquid that serves as a reactive diluent when mixed with an acrylate oligomer, providing the desired resin viscosity and increasing the resin's reactivity. Tripropylene glycol diacrylate content in the composition may be found ranging between about 0-30 wt %. Some properties of tripropylene glycol diacrylate are found in Table 5.

TABLE 5

| Tripropylene glycol diacrylate | |
|---|---|
| Parameter | Value |
| Density at 25° C., kg/m³ | 1020-1040 |
| Viscosity at 25° C., mPa · s | 10-15 |
| Refractive Index, unit | 1.450 |
| Molecular Weight, g/mol | 300 | in some embodiments, tripropylene glycol diacrylate can be partially or entirely replaced by other difunctional (meth)acrylate monomers such as dipropylene glycol diacrylate, and triethylene glycol dimethacrylate, neopentyl glycol propoxylate diacrylate, 1,6-hexanediol diacrylate, hydroxypivalic acid neopentyl glycol diacrylate, tricyclodecanediol diacrylate, and polyethylene glycol diacrylate.

Neopentyl glycol diacrylate is a low viscosity light color liquid. In some embodiments, neopentyl glycol diacrylate may be found ranging between about 0 to 30 wt %. Some properties of neopentyl glycol diacrylate are found in Table 6.

TABLE 6

| Neopentyl glycol propoxylate diacrylate | |
|---|---|
| Parameter | Value |
| Density at 25° C., kg/m³ | 1007 |
| Viscosity at 25° C., mPa · s | 10-20 |
| Refractive Index, unit | 1.446 |
| Molecular Weight, g/mol | 328 |
| Acid value, mg KOH/g | ≤0.7 |

Tricyclodecanediol diacrylate is a low-viscosity transparent liquid with a higher viscosity than tripropylene glycol diacrylate. In some embodiments, tricyclodecanediol diacrylate may be found ranging between 0 to 30 wt % of the formulation. Some properties of tricyclodecanediol diacrylate are found in Table 7.

TABLE 7

| Tricyclodecanediol diacrylate | |
|---|---|
| Parameter | Value |
| Density at 25° C., kg/m³ | 1090 |
| Viscosity at 25° C., mPa · s | 160 |
| Molecular Weight, g/mol | 300 |

The use of tricyclodecanediol diacrylate in the composition provides an increase in elastic modulus, compression strength, glass transmission temperature, and a decrease in the coefficient of linear thermal expansion.

In some embodiments, tripropylene glycol diacrylate can be partially or completely replaced by monofunctional (meth)acrylate monomers such as isobornyl acrylate, hydroxyethyl methacrylate, 4-tert-butylcyclohexyl acrylate, phenoxyethyl acrylate, and monofunctional epoxy acrylate.

Isobornyl acrylate is a monofunctional reactive diluent. In some embodiments, isobornyl acrylate may be found ranging between about 0 to 30 wt %. Some properties of isobornyl acrylate are found in Table 8.

TABLE 8

| Isobornyl acrylate | |
|---|---|
| Parameter | Value |
| Density at 25° C., kg/m³ | 970 |
| Viscosity at 25° C., mPa · s | 6-10 |
| Molecular Weight, g/mol | 208 |
| Acid value, mg KOH/g | ≤0.5 |

The replacement of tripropylene glycol diacrylate with isobornyl acrylate provides an increase in elastic modulus, tensile and compression strength, glass transmission temperature, and shrinkage decrease.

In some embodiments, tripropylene glycol diacrylate can be partially or completely replaced by multifunctional (meth)acrylate monomer with functionality 3 and above such as trimethylolpropane triacrylate, trimethylolpropane ethoxy triacrylate, acrylated glycerol derivative, and pentaerythritol tetraacrylate.

In some embodiments, any combination of acrylate monomers may be used.

UV photoinitiators are compounds producing free radicals when exposed to UV light. The radicals generated by UV light of the specific wavelength initiate polymerization of acrylate oligomers and acrylate monomers, which leads to the curing of the composition. The UV photoinitiators may be found ranging between about 0.02-1.0 wt % of the composition. The UV photoinitiator concentration of less than 0.02 wt % leads to a significant decrease in the cure rate, reduced conversion, and interlayer adhesion, which can lead to delamination during printing and following lifetime operation. The UV photoinitiator concentration above 1.0 wt % causes a decrease in the strength of the construction material.

In some embodiments, the UV photoinitiator may be a Type I photoinitiator. The Type I photoinitiators are unimolecular free-radical generators; upon the absorption of UV light, a specific bond within the initiator's structure undergoes homolytic cleavage to produce free radicals.

In some embodiments, Type I photoinitiator may be phosphine-type photoinitiators such as phenylbis(2,4,6-trimethylbenzoyl)phosphine oxide, diphenyl(2,4,6-trimethylbenzoyl)phosphine oxide, and ethyl (2,4,6-trimethylbenzoyl) phenyl phosphinate.

The use of phenylbis(2,4,6-trimethylbenzoyl)phosphine oxide as a UV photoinitiator provides a greater depth of the composition curing and curing rate. Phenylbis(2,4,6-trimethylbenzoyl)phosphine oxide may be found ranging between about 0.02-0.5 wt % of the composition. Some properties of Phenylbis(2,4,6-trimethylbenzoyl)phosphine oxide is found in Table 9.

TABLE 9

Phenylbis(2,4,6-trimethylbenzoyl)phosphine oxide

| Parameter | Value |
| --- | --- |
| Density at 25° C., kg/m³ | 1170 |
| Form | White to Yellow to Green powder to crystalline |
| Molecular Weight, g/mol | 418 |
| Acid value, mg KOH/g | ≤0.20 |
| Melting point, ° C. | 131-135 |

In some embodiments, UV photoinitiators may be Type II photoinitiators, such as benzophenone and its derivatives, 2-isopropylthioxanthone, and 2,4-diethylthioxanthone. Type II photoinitiators absorb UV light to form excited molecules which then abstract an electron or hydrogen atom from a donor molecule (synergist, co-initiator), usually alcohol or amine. The donor molecule then reacts with a monomer to initiate polymerization.

In some embodiments, the combinations of any UV photoinitiators mentioned above may be used.

To prevent combustion of the 3D printing construction materials all claimed compositions have at least 2.0 wt % of a flame retardant. In some embodiments, a flame retardant is a monoammonium phosphate. Monoammonium phosphate with particle size between about 10-1000 µm may be found ranging between about 6.0-20.0 wt % of the composition. Some properties of monoammonium phosphate are found in Table 10.

TABLE 10

Monoammonium Phosphate

| Parameter | Value |
| --- | --- |
| N content, % | 12 ± 1 |
| P₂O₅ content, % | 61 ± 1 |
| pH (1% solution in water) | 4.5-4.7 |
| Particle size, µm | 10-1000 |

In some embodiments, ammonium polyphosphate, a powder material with an average particle size of 10-30 µm may be used as a highly effective flame retardant with low water solubility and high decomposition temperature. The ammonium polyphosphate may be found ranging in composition between about 6.0-20.0 wt % of the composition. Some properties of the ammonium polyphosphate are found in Table 11.

TABLE 11

Ammonium polyphosphate

| Parameter | Value |
| --- | --- |
| Average polymerization degree, n | ≥1000 |
| pH value (10% aqueous suspension) | 5.5-7.5 |
| Average particle size, µm | 18 |
| Decomposition temperature, ° C. | ≥270 |

In some embodiments, brominated or chlorinated organic compounds, known as halogenated flame retardants, may be used as flame retardants. Halogenated flame retardants can be found ranging between about 2.0-10.0 wt % of the composition.

In some embodiments, combinations of the flame retardants mentioned above may be used.

In general, fillers in the composition increase elastic modulus and strength, reduce the coefficient of linear thermal expansion of the material, reduce shrinkage and reduce the carbon footprint. The content of the filler in the composition may be found ranging between about 20-80 wt %.

Excess filler content above 80 wt % leads to a decrease in the flowability of the composition. As a result, it becomes necessary to reduce the feed rate of the material into the printer to avoid flow breaks and the formation of air gaps in the material.

In some embodiments, the filler may be glass beads. Glass beads are transparent particles of glass close to a spherical shape that contributes to good fluidity and substantial curing depth of the composition even with a high filler content as well as high rigidity and low coefficient of linear thermal expansion of the construction material. In some embodiments, glass beads may be found ranging between about 20-70 wt %; of the composition. Glass beads' size may vary between 10 and 500 µm.

In some detailed embodiments, glass beads may have a particle size of 10-150 µm.

In some embodiments, glass beads treated with a coupling agent may be used to increase adhesion to the resin.

Some properties of glass beads with two coupling agents are found in Tables 12 and 13.

TABLE 12

Glass Beads with Type 1 coupling agent, Weissker

| Parameter | Value |
| --- | --- |
| Specific weight, g/cm3 | ~2.5 |
| Bulk weight, kg/l | ~1.5 |
| Particles size (>90%), µm | 10-150 |
| Roundness, % | >80 |
| Coupling agent Type 1 | Not identified by the producer |

TABLE 13

Glass Beads with Type 2 coupling agent, Swarco C1

| Parameter | Value |
|---|---|
| Specific weight, g/cm3 | ~2.5 |
| Bulk weight, kg/l | ~1.5 |
| Particles size (>90%), μm | 10-150 |
| Roundness, % | >80 |
| Coupling agent Type 2 | C1 |

In some embodiments, glass beads may be partially replaced with grinded glass. The addition of grinded glass to the composition reduces carbon footprint and a cost because it is made from waste.

Grinded glass particle size may vary between 10 and 300 μm.

In some embodiments, glass beads can be partially or completely replaced with chopped fiberglass to reduce warpage and increase the crack resistance of the material.

In some embodiments, glass beads can be partially or completely replaced with polymer fillers to reduce the density and heat conductivity of the material.

In some embodiments, glass beads may be partially or completely replaced with organic fillers from renewable raw materials such as cellulose and wood flour to reduce density, heat conductivity, and carbon footprint.

In some embodiments, glass beads may be partially or completely replaced with quartz sand or desert sand to reduce cost and carbon footprint.

In some embodiments, recycled 3D printed construction material claimed in this invention can be used as a filler that provides waste-free production and the possibility of recycling building structures after the end of the operating period which guarantees a decrease in carbon footprint. The particle size of the 3D printed construction material may vary between 10 and 3000 μm.

The fillers, the subject in the present invention may be used in some embodiments in combinations.

Additives refer to the substances that are added to the composition in small quantities to improve technological properties, storage stability, durability, and strengthening of the material.

In the present invention, additives comprise at least one of rheologyditive, in-can stabilizers, defoamers, processing aids, dispersants, amine synergists, adhesion promoters, UV protectors, or a combination thereof.

In some embodiments, rheology additives may be used to improve the rheological properties of the composition and prevent the filler sedimentation and the formation of a dense precipitate during storage.

In some embodiments, a rheology additive may be a thixotropic additive. Thixotropic additives may be used to increase storage stability and filler sedimentation resistance. The use of a thixotropic additive leads to a significant increase in the viscosity of the composition a a low shear rate or at static conditions and prevents the sedimentation of the filler during storage. At the same time, as the shear rate increases during processing, the viscosity of the composition decreases significantly. In some embodiment of the composition, the thixotropic additive may be found ranging between about 0-1.0 wt % of the composition.

In some embodiments, the thixotropic additive may be organically modified phyllosilicates. The organically modified phyllosilicates may be found ranging between about 0 to 1.0 wt %. Some properties of organically modified phyllosilicates are found in Table 14.

TABLE 14

Organically modified phyllosilicates

| Parameter | Value |
|---|---|
| Form | Fine Powder |
| Moisture Content, % | <6 |
| Loss on ignition, % | 29-33 |
| Specific Gravity, kg/l | 1.5-1.7 |

In-can stabilizers are substances improving the material's stability by preventing polymerization during storage. In some embodiments, in-can stabilizers may be found ranging between about 0-1.0 wt % of the composition.

Defoamers are substances that limit the formation of bubbles in the process of manufacturing a composite material for 3D printing. In some embodiments, the defoamers may be found ranging between about 0-1.0 wt % of the composition.

Processing aids are substances improving the processability of composition by reducing viscosity and friction between the composition and the processing machinery and/or increasing. In some embodiments, the processing aids may be found ranging between about 0-1.0 wt %.

Dispersants are substances improving dispersing of the filler and flame retardant particles. In some embodiments, the dispersants may be found ranging between about 0-1.0 wt %.

Amine synergists are the substances that act synergistically with Type II UV photoinitiators producing a reactive alkyl-amino free radical. Amine synergists can also reduce oxygen inhibition of the polymerization. In some embodiments, the amine synergists may be found ranging between about 0-1.0 wt %.

Adhesion promoters are the substances improving the adhesion of construction material to other materials. In some embodiments, the adhesion promoters may be found ranging between about 0-1.0 wt % of the composition to improve the adhesion of construction material to foam and coatings.

UV protection additives are the substances protecting the 3D construction material against UV exposure during the lifetime operation of the 3D printed construction. In some embodiments, the UV protection additives may be found ranging between about 0-1.0 wt % of the composition to protect the construction material against UV exposure during operation.

The composition may contain several of the above additives at the same time.

In some embodiments, the composition may be prepared without additives.

The 3D printing compositions for construction materials are examples as follows.

The following examples are offered by way of illustration and not by way of limitation.

To meet all requirements for a composite material intended for 3D printing of building structures the material must have the following characteristics: viscosity in the range between about 10 000-300 000 mPa·s, which provides appropriate flow properties and stability to sedimentation, the printing speed of 7-90 cm$^3$/sec during 3D printing, and the photopolymerization reaction under UV irradiation to proceed rapidly at a depth of about 4 to 8 mm.

At the same time, the choke of composition components should support the following properties of the solidified final product after 3D printing paint adhesion strength of at least 1.5 MPa to reliably protect building structures from the effects of weather factors;

foam adhesion strength—at least 0.2 MPa in order to ensure joint work of two shells and resistance to local buckling of the shell;

tensile modulus—at least 2 GPa to ensure the rigidity of the building structure;

tensile strength is at least 8 MPa to ensure the safety of the building structure;

compression modulus—at least 2 GPa to ensure the rigidity of the building structure;

compression strength—at least 40 MPa to ensure the strength of the building structure;

density not exceeding 2000 kg/m$^3$ to ensure the low weight of the building structure and sound resistance;

thermal conductivity—not exceeding 0.55 W/(m·K) to ensure the thermal insulation properties of the building structure to maintain thermal comfort microclimate inside buildings;

coefficient of linear thermal expansion—not exceeding 50*10$^{-6\circ}$ C.$^{-1}$ to maintain the integrity of the structure and prevent excessive deformations under temperature effects;

impact resistance—at least 1.0 kJ/m$^2$ to ensure the safety of building structures;

heat deflection temperature—at least 60° C. to ensure the safety of building structures; and critical surface density of heat flux, not exceeding 11 kW/sq·m, is necessary to ensure the safety of the buildings.

Paint adhesion strength was measured using the pull-off test for adhesion, which measures the force required to pull the coating off the painted surface.

Foam adhesion was measured by the pull-off method using a tensile testing machine as the force required to pull the foam off the surface.

Tensile modulus is the slope of the linear part of the stress-strain curve for material under tension.

Tensile strength was measured by a standard test in which a sample is subjected to a controlled tension until failure.

Compression modulus is the slope of the linear part of the stress-strain curve for material under compression.

Compression strength is the stress at which the specimen breaks when the specimen is compressed.

Density was determined by hydrostatic weighing (displacement method), which is based on measuring the difference in the weight of a sample in air and a liquid with a known density.

Thermal conductivity was determined by the heat source (hot disc) method, which is based on measuring the change in temperature of a sensor built into the sample after the pulsed generation of a thermal pulse.

The coefficient of linear thermal expansion was determined from the change in the size of the test sample with temperature using thermomechanical analysis equipment.

The impact resistance was determined by the Izod impact resistance method, which consists in determining the energy of the pendulum, which is spent on the destruction of the sample during impact.

Heat deflection temperature was determined by a standard test in which the test specimen, located on two supports in the "flat" position, under the action of a constant load (1.8 MPa) and heated at a constant rate, bends by a given amount.

The critical surface density of heat flux was determined from the length of flame propagation over the sample as a result of the heat flux on its surface using the Spread flame test method.

All composite formulations that are subject of the invention and presented in examples satisfy the requirements for the 3D printing construction materials:

viscosity in the range between about 10 000-300 000 mPa·s, which provides appropriate flow properties and stability to sedimentation, the printing speed of 7-90 cm$^3$/sec during 3D printing, the photopolymerization reaction under UV irradiation to proceed rapidly depth of about between 4 to 8 mm.

Example 1

Table 15 shows the components and quantity of Formulation #1 for the composite material for use in 3D printing additive manufacturing.

TABLE 15

| Formulation # 1 | | |
| --- | --- | --- |
| Ingredient | wt % | Function |
| Tripropylene glycol diacrylate | 13.0 | Acrylate monomer |
| Modified bisphenol A epoxy diacrylate | 13.0 | Acrylate oligomer |
| Glass Beads with Type 1 coupling agent | 63.82 | Filler |
| Monoammonium phosphate | 10.1 | Flame retardant |
| Phenylbis(2,4,6-trimethylbenzoyl)phosphine oxide | 0.08 | UV photoinitiator |

Table 16 shows some resulting properties of Formulation #1.

TABLE 16

| Properties of Formulation #1 | |
| --- | --- |
| Parameter | Value |
| Tensile modulus, GPa | 5.3 |
| Tensile strength, MPa | 10.4 |
| Compression modulus, GPa | 4.0 |
| Compression strength, MPa | 52.5 |
| Impact resistance, kJ/m$^2$ | 1.5 |
| Density, kg/m$^3$ | 1833 |
| Thermal conductivity, W/(m · K) | 0.45 |
| Coefficient of linear thermal expansion, ×10$^{-6\circ}$ C.$^{-1}$ | 34 |
| Paint adhesion strength, MPa | 2.4 |
| Foam adhesion strength, MPa | 0.3 |
| Heat deflection temperature, ° C. | 64 |
| A critical surface density of heat flux, kW/m$^2$ | >11 |

All parameters of Formulation #1 meet the requirements for a composite material for 3D printing of building structures.

Example 2

Table 17 shows the components and quantity Formulation #2. Formulation #2 differs from Formulation #1 in that the flame retardant is ammonium polyphosphate.

TABLE 17

| Formulation #2 | | |
|---|---|---|
| Ingredient | wt % | Function |
| Tripropylene glycol diacrylate | 13.0 | Acrylate monomer |
| Modified bisphenol A epoxy diacrylate | 13.0 | Acrylate oligomer |
| Glass Beads with Type 1 coupling agent | 63.82 | Filler |
| Ammonium polyphosphate | 10.1 | Flame retardant |
| Phenylbis(2,4,6-trimethylbenzoyl)phosphine oxide | 0.08 | UV photoinitiator |

Table 18 shows some properties of Formulation #2

TABLE 18

| Properties of Formulation #2 | |
|---|---|
| Parameter | Value |
| Tensile modulus, GPa | 10.2 |
| Tensile strength, MPa | 14.5 |
| Compression modulus, GPa | 5.4 |
| Compression strength, MPa | 61.8 |
| Impact resistance, kJ/m$^2$ | 2.0 |
| Thermal conductivity, W/(m · K) | 0.51 |
| Coefficient of linear thermal expansion, ×10$^{-6}$ °C.$^{-1}$ | 33 |
| Heat deflection temperature, ° C. | 70 |

Referring now to Tables 16 and 18 to compare the properties of Formulation #1 and #2, the flame retardant replacement of monoammonium phosphate with ammonium polyphosphate leads to a substantial increase in the tensile modulus and tensile strength, compression modulus, and strength of the composite material in Formulation #2. The increase in elastic modulus and strength compared to Formulation #1 makes it possible to reduce the wall thickness of the building panel, which will reduce the material consumption for building construction and, as a result, its cost and carbon footprint. All parameters of Formulation #2 meet the requirements for a composite material for 3D printing of building structures.

Example 3

Table 19 shows the components and quantities for Formulation #3. Formulation #3 differs from Formulation #1 in Table 15 in that the acrylate oligomer is Bisphenol A epoxy diacrylate.

TABLE 19

| Formulation #3 | | |
|---|---|---|
| Ingredient | wt % | Function |
| Tripropylene glycol diacrylate | 16.0 | Acrylate monomer |
| Bisphenol A epoxy diacrylate | 10.0 | Acrylate oligomer |
| Glass Beads with Type 1 coupling agent | 63.82 | Filler |

TABLE 19-continued

| Formulation #3 | | |
|---|---|---|
| Ingredient | wt % | Function |
| Monoammonium phosphate | 10.1 | Flame retardant |
| Phenylbis(2,4,6-trimethylbenzoyl)phosphine oxide | 0.08 | UV photoinitiator |

Table 20 shows some properties of Formulation #3.

TABLE 20

| Properties of Formulation #3 | |
|---|---|
| Parameter | Value |
| Tensile modulus, GPa | 4.6 |
| Tensile strength, MPa | 12.1 |
| Compression modulus, GPa | 4.8 |
| Compression strength, MPa | 59.7 |
| Impact resistance, kJ/m$^2$ | 1.6 |
| Coefficient of linear thermal expansion, ×10$^{-6}$ °C.$^{-1}$ | 32 |
| Heat deflection temperature, ° C. | 74 |

Referring now to Tables 16 and 20, a comparison of the properties of Formulations #1 and #3 shows that replacing modified bisphenol A epoxy diacrylate with Bisphenol A epoxy diacrylate resulted in increased heat deflection temperature, which makes it possible to use the material for construction in hotter regions. All parameters of Formulation 43 meet the requirements for a composite material for 3D printing building structures.

Example 4

Table 21 shows the components and quantities for Formulation #4. Formulation #4 differs from Formulation #1 in Table 15 in that the acrylate oligomer is polyester acrylate.

TABLE 21

| Formulation #4 | | |
|---|---|---|
| Ingredient | wt % | Function |
| Tripropylene glycol diacrylate | 13.0 | Acrylate monomer |
| Polyester acrylate | 13.0 | Acrylate oligomer |
| Glass Beads with Type 1 coupling agent | 63.82 | Filler |
| Monoammonium phosphate | 10.1 | Flame retardant |
| Phenylbis(2,4,6-trimethylbenzoyl)phosphine oxide | 0.08 | UV photoinitiator |

Table 22 shows some properties of Formulation #4.

TABLE 22

| Properties of Formulation #4 | |
|---|---|
| Parameter | Value |
| Tensile modulus, GPa | 3.1 |
| Tensile strength, MPa | 8.0 |
| Compression modulus, GPa | 3.7 |
| Compression strength, MPa | 43.4 |
| Impact resistance, kJ/m$^2$ | 1.3 |
| Thermal conductivity, W/(m · K) | 0.43 |
| Coefficient of linear thermal expansion, ×10$^{-6}$ °C.$^{-1}$ | 32 |

When the properties of Formulations #1 and #4 are compared, Formulation #4 has a lower tensile modulus and a tensile strength of the composite material. All parameters of Formulation #4 meet the requirements for a composite material for 3D printing of building structures.

Example 5

Table 23 shows the components and quantities for Formulation #5. Formulation #5 differs from Formulation #1 in Table 15 in that the acrylate monomer is neopentyl glycol diacrylate.

TABLE 23

| Formulation #5 | | |
| --- | --- | --- |
| Ingredient | wt % | Function |
| Neopentyl glycol diacrylate | 13.0 | Acrylate monomer |
| Modified bisphenol A epoxy diacrylate | 13.0 | Acrylate oligomer |
| Glass Beads with Type 1 coupling agent | 63.82 | Filler |
| Monoammonium phosphate | 10.1 | Flame retardant |
| Phenylbis(2,4,6-trimethylbenzoyl)phosphine oxide | 0.08 | UV photoinitiator |

Table 24 shows some mechanical properties of Formulation #5.

TABLE 24

| Properties of Formulation #5 | |
| --- | --- |
| Parameter | Value |
| Tensile modulus, GPa | 4.3 |
| Tensile strength, MPa | 10.7 |
| Compression modulus, GPa | 4.8 |
| Compression strength, MPa | 52.0 |
| Impact resistance, kJ/m$^2$ | 2.2 |
| Coefficient of linear thermal expansion, $\times 10^{-6}$ °C.$^{-1}$ | 33 |

Referring now to Tables 16 and 24, a comparison of the properties of Formulations #1 and #5 shows that the use of neopentyl glycol diacrylate as a monomer instead of tripropylene glycol diacrylate does not lead to a noticeable change in the properties. All parameters of Formulation #5 meet the requirements for a composite material for 31) printing of building structures.

Example 6

Table 25 shows the components and quantities for Formulation #6. Formulation #6 differs from Formulation #1 in Table 15 in that the acrylate monomer is isobornyl acrylate.

TABLE 25

| Formulation #6 | | |
| --- | --- | --- |
| Ingredient | wt % | Function |
| Isobornyl acrylate | 13.0 | Acrylate monomer |
| Modified bisphenol A epoxy diacrylate | 13.0 | Acrylate oligomer |
| Glass Beads with Type 1 coupling agent | 63.82 | Filler |

TABLE 25-continued

| Formulation #6 | | |
| --- | --- | --- |
| Ingredient | wt % | Function |
| Monoammonium phosphate | 10.1 | Flame retardant |
| Phenylbis(2,4,6-trimethylbenzoyl)phosphine oxide | 0.08 | UV photoinitiator |

Table 26 shows some properties of Formulation #6.

TABLE 26

| Properties of Formulation #6 | |
| --- | --- |
| Parameter | Value |
| Tensile modulus, GPa | 7.6 |
| Tensile strength, MPa | 13.9 |
| Compression modulus, GPa | 7.3 |
| Compression strength, MPa | 66.5 |
| Impact resistance, kJ/m$^2$ | 2.0 |
| Thermal conductivity, W/(m · K) | 0.46 |
| Coefficient of linear thermal expansion, $\times 10^{-6}$ °C.$^{-1}$ | 34 |

Referring now to Tables 16 and 26, a comparison of the properties of Formulations #1 and #6 shows that the use of isobornyl acrylate as a monomer instead of tripropylene glycol diacrylate leads to an increase in the tensile and compression modulus, tensile and compression strength of the material. Increasing the strength and elastic modulus makes it possible to reduce the wall thickness of the building panel, which will reduce the material consumption of the building and, as a result, its cost and carbon footprint. All Formulation #6 parameters meet the requirements for a composite al for 3D printing of building structures.

Example 7

Table 27 shows the components and quantities for Formulation #7. Formulation #7 differs from Formulation #1 in Table 15 in that the organically modified phyllosilicates were used as additives in Formulation #7.

TABLE 27

| Formulation #7 | | |
| --- | --- | --- |
| Ingredient | wt % | Function |
| Tripropylene glycol diacrylate | 13.0 | Acrylate monomer |
| Modified bisphenol A epoxy diacrylate | 13.0 | Acrylate oligomer |
| Glass Beads with Type 1 coupling agent | 63.67 | Filler |
| Monoammonium phosphate | 10.1 | Flame retardant |
| Phenylbis(2,4,6-trimethylbenzoyl)phosphine oxide | 0.08 | UV photoinitiator |
| Organically modified phyllosilicates | 0.15 | Additives |

Table 28 shows some properties of Formulation #7.

TABLE 28

| Properties of Formulation #7 | |
| --- | --- |
| Parameter | Value |
| Tensile modulus, GPa | 4.3 |
| Tensile strength, MPa | 11.7 |
| Compression modulus, GPa | 5.0 |
| Compression strength, MPa | 52.6 |
| Impact resistance, kJ/m$^2$ | 2.0 |

TABLE 28-continued

Properties of Formulation #7

| Parameter | Value |
| --- | --- |
| Thermal conductivity, W/(m · K) | 0.48 |
| Coefficient of linear thermal expansion, ×10$^{-6}$ °C.$^{-1}$ | 30 |
| Paint adhesion strength, MPa | 2.5 |

Referring now to Tables 16 and 28, a comparison of the properties of Formulations #1 and #7 shows that the use of organically modified phyllosilicates does not significantly affect the properties of the material but decreases the rate of sedimentation of fillers, preventing the formation of dense sediment due to thixotropic structure formation in the liquid composition. The resulting precipitate is easily recoverable after long-term storage and transportation of the material. All Formulation #7 parameters meet the requirements for a composite material for 3D printing of building structures.

Example 8

Table 29 shows the components and quantities for Formulation #8 differ from Formulation #1 in Table 16 in that the acrylate monomer is tricyclodecanediol diacrylate at a concentration of 26% while the acrylic oligomer was not used with the composition.

TABLE 29

Formulation #8

| Ingredient | wt % | Function |
| --- | --- | --- |
| Tricyclodecanediol | 26.0 | Acrylate monomer |
| Glass Beads with Type 1 coupling agent | 63.82 | Filler |
| Monoammonium phosphate | 10.1 | Flame retardant |
| Phenylbis(2,4,6-trimethylbenzoyl)phosphine oxide | 0.08 | UV photoinitiator |

Table 30 shows some properties of Formulation #8.

TABLE 30

Properties of Formulation #8

| Parameter | Value |
| --- | --- |
| Tensile modulus, GPa | 6.6 |
| Tensile strength, MPa | 11.2 |
| Compression modulus, GPa | 6.9 |
| Compression strength, MPa | 72.1 |
| Impact resistance, kJ/m$^2$ | 1.1 |
| Coefficient of linear thermal expansion, ×10$^{-6}$ °C.$^{-1}$ | 24 |

Referring now to Tables 16 and 30, a comparison of the properties of Formulations #1 and #8 shows that the use of tricyclodecanediol diacrylate as a monomer instead of tripropylene glycol diacrylate leads to an increase in the tensile and compression modulus, compression strength, and decrease in coefficient of linear thermal expansion. Nevertheless, the use of tricyclodecanediol diacrylate as an acrylate monomer instead of tripropylene glycol diacrylate leads to a decrease in Impact resistance.

Increasing the strength and elastic modulus makes it possible to reduce the wall thickness of the building panel, which will reduce the material consumption of the building and, as a result, its cost and carbon footprint. Reducing the coefficient of linear thermal expansion allows larger one-piece structures to be manufactured while maintaining a safety margin (features).

All Formulation #8 parameters meet the requirements for a composite material for 3D minting of building structures.

Example 9

Table 31 shows the components and quantity Formulation #9. Formulation #9 differs from Formulation #1 in using the Glass Beads with a Type 2 coupling agent.

TABLE 31

Formulation #9

| Ingredient | wt % | Function |
| --- | --- | --- |
| Tripropylene glycol diacrylate | 13.0 | Acrylate monomer |
| Modified bisphenol A epoxy diacrylate | 13.0 | Acrylate oligomer |
| Glass Beads with Type 2 coupling agent | 63.82 | Filler |
| Monoammonium phosphate | 10.1 | Flame retardant |
| Phenylbis(2,4,6-trimethylbenzoyl)phosphine oxide | 0.08 | UV photoinitiator |

Table 32 shows some properties of Formulation #9.

TABLE 32

Properties of Formulation #9

| Parameter | Value |
| --- | --- |
| Tensile modulus, GPa | 9.2 |
| Tensile strength, MPa | 23.4 |
| Compression modulus, GPa | 7.5 |
| Compression strength, MPa | 77.4 |
| Impact resistance, kJ/m$^2$ | 2.77 |
| Coefficient of linear thermal expansion, ×10$^{-6}$ °C.$^{-1}$ | 34 |
| Heat deflection temperature, °C. | 74 |

Referring now to Tables 16 and 32, a comparison of the properties of Formulations #1 and #9 shows that the use of glass beads with a Type 2 coupling agent as a filler leads to a significant increase in tensile and compression modulus, tensile and compression strength, and the the the impact resistance. Increasing these characteristics makes it possible to reduce the wall thickness of the building structure, which will reduce the material consumption of the building and, as a result, its cost and carbon footprint. Increasing impact strength increases the safety of building operations.

All parameters of Formulation #9 meet the requirements for a composite material for 3D printing of building structures.

A method of generating a formulation of the photopolymer composite material for use in a 3D printing system may involve combining an acrylate oligomer in the range between about 0-30.0 wt % of the composition, an acrylate monomer in the range between about 0-30.0 wt % of the composition, UV photoinitiator in the range between about 0.02-1.0 wt % of the composition, a flame retardant in the range between about 2.0-20.0 wt % of the composition, fillers in the range between about 20.0-80.0 wt % of the composition, and additives in the range between about 0-3.0 wt % of the composition in a container. The method further comprises producing a resin composite by blending the components of the composition.

This invention also involves the preparation of novel compositions of 3D printing material by mixing the components in a container. In some embodiments, mixing means a mixer or any container with a stirrer may be used for mixing the composition components in the following order:

acrylate monomer, UV photoinitiator, acrylate oligomer, a flame retardant, additives, and a filler.

All components are weighed with a specified accuracy of at least 1% of their weight. The mixture is thoroughly mixed during or after loading each component of the composition. After loading the UV photoinitiator into the acrylate monomer in the mixer, the mixture is stirred for 1-5 minutes at a stirrer speed of 20-1000 rpm. After loading the acrylate oligomer, the stirring continues for 1-6 minutes at a stirrer speed of 20-200 rpm.

In some embodiments, this stage can be eliminated if the mixing was carried out during the loading of the acrylate oligomer.

After loading flame retardant into the mixer, stirring continues for 1-5 minutes at a stirrer speed of 10-100 rpm.

In some embodiments, this stage can be eliminated if the mixing was carried out during the loading of the flame retardant.

In some embodiments, the fillers are loaded into the mixer with stirring at a speed of 10-100 rpm. After loading flame retardant into the reservoir, stirring continues for 1-10 minutes at a stirrer speed of 10-100 rpm.

Additives may be added at any stage of the process. In some embodiments, additives may be introduced in the form of prefabricated concentrates in acrylate monomer or acrylate monomer/acrylate oligomer blend.

In some embodiments, the loading of the composition components may be in an altered order, as fillers may be loaded into a mixer after flame retardant. UV photoinitiator may be loaded at any step of loading the components. Moreover, the UV photoinitiator can be loaded both in dry form and in the form of a pre-prepared solution in the acrylate monomer with a concentration of up to 2.5 wt %). It is also possible to use a liquid UV photoinitiator.

In some embodiments, a powder flame retardant or a powder filler may be mixed with the acrylate monomer first and then the acrylate oligomer may be added to the mixture. Also, in some embodiments, the stirring may be started after loading several components.

In some embodiments, a stage of the acrylate oligomer preheating to 30-60° C. allows to reduce of the viscosity and facilitates pumping into the mixer.

The mixing of the components may be carried out sequentially in two or more mixers. For example, dissolving of a UV photoinitiator in an acrylate monomer or mixing of an acrylate monomer, UV photoinitiator, additives, and flame retardant may be carried out in the first mixer with a high-speed stirrer such as a turbine, propeller, or dissolver stirrer. The resulting solution or suspension may be pumped into the second mixer for mixing with fillers and other components by using a slow-speed stirrer such as an anchor type.

Example 10

Method of the Composition's Production

The procedure for making a composition consists in mixing the components at a temperature ranging between about 20-25° C.

For the production of composition two mixers are used. The mixer 1 with a volume of 0.35 m$^3$ is equipped with weighing cells with an accuracy of 0.5 kg and a dissolver stirrer. Mixer 2 with a volume of 1.0 m$^3$ is equipped with weighing cells with an accuracy of 1.0 kg as well as anchor and dissolver stirrers.

200 kg (13.0 wt % of the composition) tripropylene glycol diacrylate is pumped into the mixer 1. 1200 g (0.08 wt % of the composition) Phenylbis(2,4,6-trimethylbenzoyl)phosphine oxide pre-weighed on a balance with an accuracy of 1 g is added to tripropylene glycol diacrylate. The mixture is stirred for 5 minutes at a stirrer speed of 750 rpm to dissolve Phenylbis(2,4,6-trimethylbenzoyl)phosphine oxide in tripropylene glycol diacrylate, after which the solution of Phenylbis(2,4,6-trimethylbenzoyl)phosphine oxide in tripropylene glycol diacrylate is pumped from mixer 1 into mixer 2. 200 kg (13.0 wt % of the composition) modified bisphenol A epoxy diacrylate is pumped into mixer 2 within 20 minutes with stirring at the anchor stirrer speed of 25 rpm. 155 kg (10.1 wt % by of the composition) monoammonium phosphate is loaded into mixer 2 within 5 minutes with stirring at the anchor stirrer speed of 25 rpm. Before the loading, monoammonium phosphate is ground in a hammer mill. As a result of this grinding, particles with a size between about 20-1000 μm are formed. Thereafter, 982 kg (63.82 wt % of the composition) glass beads with Type 1 coupling agent are loaded into mixer 2 within 20 minutes with stirring at the anchor stirrer speed of 25 rpm and dissolver stirrer of 500 rpm. After loading the glass beads, the stirring continues for 5 minutes. Then, the resulting composition is pumped into barrels.

Example 11

Method of the Composition's Production

The procedure for making a composition consists in mixing the components at a temperature ranging between about 20-25° C.

The components are mixed in a barrel placed on a balance with an accuracy of 0.1 kg. 23.4 kg (15.6 wt % of the composition) tripropylene glycol diacrylate is pumped into the barrel. 117 g (0.08 wt % of the composition) of Phenylbis (2,4,6-trimethylbenzoyl)phosphine oxide pre-weighed on a balance with an accuracy of 0.5 g is added to tripropylene glycol diacrylate after which the frame stirrer is placed in the barrel. The mixture is stirred for 2 minutes at a stirrer speed of 100 rpm, after which 15.2 kg (10.1 wt % of the composition) APP is loaded into the barrel. After loading APP into the barrel, stirring continued for 4 minutes at a stirrer speed of 100 rpm, after which 15.6 kg (10.4 wt % of the composition) of bisphenol A epoxy diacrylate is loaded into the barrel. After loading the bisphenol A epoxy diacrylate, the stirring continues for 6 minutes at a stirrer speed of 40 rpm. Thereafter, 95.7 kg (63.82 wt % of the composition) glass beads with a Type 1 coupling agent are loaded in three separate portions. The first portion contains 50% of the total glass beads of the composition. The following stirring continues for 4 minutes at a stirrer speed of 40 rpm. Each portion of the second and third load contains 25% of the total fillers in the composition. After loading the second portion, the stirring continues for 6 minutes at a stirrer speed of 30 rpm, and for 10 minutes at a stirrer speed of 30 rpm for the third portion.

Example 12

Method of the Composition's Production

The procedure for making a composition consists in mixing the components at a temperature ranging between about 20-25° C.:

For the production of composition two mixers are used. The mixer 1 with a volume of 0.35 m³ is equipped with weighing cells with an accuracy of 0.5 kg and a dissolver stirrer. Mixer 2 with a volume of 1.0 m³ is equipped with weighing cells with an accuracy of 1.0 kg as well as anchor and propeller stirrers.

234 kg (13.0 wt % of the composition) tripropylene glycol diacrylate is pumped into the mixer 1. 1400 g (0.08 wt % of the composition) phenylbis(2,4,6-trimethylbenzoyl)phosphine oxide pre-weighed on a balance with an accuracy of 1 g is added to tripropylene glycol diacrylate. The mixture is stirred for 5 minutes at a stirrer speed of 750 rpm to dissolve phenylbis(2,4,6-trimethylbenzoyl)phosphine oxide in tripropylene glycol diacrylate, after which the solution of phenylbis(2,4,6-trimethylbenzoyl)phosphine oxide in tripropylene glycol diacrylate is pumped from mixer 1 into mixer 2. 234 kg (13.0 wt % of the composition) modified bisphenol A epoxy diacrylate is pumped into mixer 2 within 20 minutes with stirring at the anchor stirrer speed of 25 rpm. 182 kg (10.1 wt % of the composition) monoammonium phosphate is loaded into mixer 2 within 5 minutes with stirring at the anchor stirrer speed of 25 rpm. Before use, monoammonium phosphate was sifted through a sieve with a mesh size of 1.0 mm. Thereafter, 2.7 kg (0.15 wt % of the composition) organically modified phyllosilicates are loaded into mixer 2 within 1 minute with stirring at the anchor stirrer speed of 25 rpm and propeller stirrer of 500 rpm. After loading organically modified phyllosilicates, the stirring continues for 5 minutes. Thereafter, 1146 kg (63.67 wt % of the composition) of glass beads with a Type 1 coupling agent are loaded into mixer 2 within 20 minutes with stirring at the anchor stirrer speed of 25 rpm and propeller stirrer of 500 rpm. After loading the glass beads, the stirring continues for 5 minutes. Then, the resulting composition is pumped into barrels.

What is claimed is:

1. A composition of three-dimensional ("3D") printable photocurable material, the composition comprising:
   one or more acrylate oligomers in a combined range between about 0-30.0 wt % of the composition;
   one or more acrylate monomers in a combined range between about 0-30.0 wt % of the composition, wherein the composition includes at least one acrylate oligomer or acrylate monomer;
   one or more photoinitiators in a combined range between about 0.02-1.0 wt % of the composition;
   one or more flame retardants in a combined range between about 2.0-20.0 wt % of the composition;
   one or more fillers in a combined range between about 20.0-80.0 wt % of the composition; and
   one or more additives in a combined range between about 0-3.0 wt % of the composition, wherein the 3D printable photocurable material has a viscosity of about 10,000-300,000 mPa·s, is configured to be extruded at a printing speed of about 7-90 cm³/s during 3D printing, and is configured to be photopolymerized under UV or visible irradiation at a material depth of about 4-8 mm to form a building construction material.

2. The composition of claim 1, wherein said acrylate oligomer is bisphenol A epoxy diacrylate.

3. The composition of claim 1, wherein said acrylate oligomer is modified bisphenol A epoxy diacrylate.

4. The composition of claim 1, wherein said acrylate monomer is tripropylene glycol diacrylate.

5. The composition of claim 1, wherein said acrylate monomer comprises at least one of monofunctional (meth) acrylate, difunctional (meth)acrylate, multifunctional (meth) acrylate, or a combination thereof.

6. The composition of claim 1, wherein said UV photoinitiator is phenylbis(2,4,6-trimethylbenzoyl)phosphine oxide.

7. The composition of claim 6, wherein said phenylbis(2, 4,6 trimethylbenzoyl)phosphine oxide is ranging between about 0.02-0.5 wt % of the composition.

8. The composition of claim 1, wherein said UV photoinitiator is Type I photoinitiator.

9. The composition of claim 1, wherein said UV photoinitiator is Type II photoinitiator.

10. The composition of claim 1, wherein said UV photoinitiator comprises said Type I and said Type II photoinitiators in combination.

11. The composition of claim 1, wherein said flame retardant is monoammonium phosphate.

12. The composition of claim 11, wherein said monoammonium phosphate is ranging between about 6.0-20.0 wt % of the composition.

13. The composition of claim 1, wherein said flame retardant is ammonium polyphosphate.

14. The composition of claim 13, wherein said ammonium polyphosphate is ranging between about 6.0-20.0 wt % of the composition.

15. The composition of claim 1, wherein said fillers are glass beads.

16. The composition of claim 15, wherein said glass beads are ranging between about 20-70 wt % of the composition.

17. The composition of claim 15, wherein said glass beads are treated with a coupling agent to increase adhesion to the resin.

18. The composition of claim 1, wherein said fillers comprise at least one of chopped fiberglass, polymer fillers, organic fillers, quartz sand, desert sand, grinded glass, recycled 3D printed construction material, or a combination thereof.

19. The composition of claim 1, wherein said additives comprise at least one of rheology additives, in-can stabilizers, defoamers, processing aids, dispersants, amine synergists, adhesion promoters, UV protectors, or a combination thereof.

20. The composition of claim 19, wherein said rheology additives is thixotropic additive.

21. The composition of claim 1, wherein said construction material has paint adhesion strength ranging between 1.5-4.0 MPa.

22. The composition of claim 1, wherein said construction material has foam adhesion strength 0.2-0.5 MPa.

23. The composition of claim 1 wherein said construction material has tensile modulus 2-12 GPa.

24. The composition of claim 1 wherein said construction material has compression modulus 2-12 GPa.

25. The composition of claim 1 wherein said 3D printed construction material has tensile strength 8-25 MPa.

26. The composition of claim 1 wherein said 3D printed construction material has compression strength as 40-80 MPa.

27. The composition of claim 1 wherein said 3D printed construction material has a density of 1200-2000 kg/m³.

28. The composition of claim 1, wherein:
   the one or more acrylate oligomers include modified bisphenol A epoxy diacrylate at about 13 wt % of the composition;
   the one or more acrylate monomers include tripropylene glycol diacrylate at about 13 wt % of the composition;

the one or more photoinitiators include phenylbis(2,4,6 trimethylbenzoyl)phosphine oxide at about 0.08 wt % of the composition;

the one or more flame retardants include monoammonium phosphate or ammonium polyphosphate at about 10 wt % of the composition; and the one or more fillers include glass beads at about 63 wt % of the composition.

29. The composition of claim 1, wherein:

the one or more acrylate oligomers include bisphenol A epoxy diacrylate at about 10 wt % of the composition;

the one or more acrylate monomers include tripropylene glycol diacrylate at about 16 wt % of the composition;

the one or more photoinitiators include phenylbis(2,4,6 trimethylbenzoyl)phosphine oxide at about 0.08 wt % of the composition;

the one or more flame retardants include monoammonium phosphate or ammonium polyphosphate at about 10 wt % of the composition; and the one or more fillers include glass beads at about 63 wt % of the composition.

30. The composition of claim 1, wherein:

the one or more acrylate oligomers include polyester acrylate at about 13 wt % of the composition;

the one or more acrylate monomers include tripropylene glycol diacrylate at about 13 wt % of the composition;

the one or more photoinitiators include phenylbis(2,4,6 trimethylbenzoyl)phosphine oxide at about 0.08 wt % of the composition;

the one or more flame retardants include monoammonium phosphate or ammonium polyphosphate at about 10 wt % of the composition; and the one or more fillers include glass beads at about 63 wt % of the composition.

31. A composition of three-dimensional ("3D") printable photocurable material, the composition comprising:

one or more acrylate oligomers, acrylate monomers, or both, the one or more acrylate oligomers and/or acrylate monomers having a combined range between about 1.0-30.0 wt % of the composition;

one or more photoinitiators having a combined range between about 0.02-1.0 wt % of the composition;

one or more flame retardants having a combined range between about 2.0-20.0 wt % of the composition; and glass beads having a combined range between about 20.0-70.0 wt % of the composition.

32. The composition of claim 31, wherein the glass beads have a particle size between about 10-500 μm and are treated with a coupling agent.

33. The composition of claim 31, wherein the 3D printable photocurable material has a viscosity of about 10,000-300,000 mPa·s, is configured to be extruded at a printing speed of about 7-90 cm$^3$/s during 3D printing, and is configured to be photopolymerized under UV or visible irradiation at a material depth of about 4-8 mm to form a building construction material.

* * * * *